United States Patent
Van Aert et al.

(10) Patent No.: US 10,144,239 B2
(45) Date of Patent: Dec. 4, 2018

(54) LASER MARKABLE COMPOSITIONS, ARTICLES AND DOCUMENTS

(71) Applicant: AGFA-GEVAERT, Mortsel (BE)

(72) Inventors: Hubertus Van Aert, Mortsel (BE); Johan Loccufier, Mortsel (BE); Dirk Kokkelenberg, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 0 days.

(21) Appl. No.: 15/574,249

(22) PCT Filed: May 11, 2016

(86) PCT No.: PCT/EP2016/060533
§ 371 (c)(1),
(2) Date: Nov. 15, 2017

(87) PCT Pub. No.: WO2016/184741
PCT Pub. Date: Nov. 24, 2016

(65) Prior Publication Data
US 2018/0134056 A1 May 17, 2018

(30) Foreign Application Priority Data

May 19, 2015 (EP) .................................... 15168097

(51) Int. Cl.
| | | |
|---|---|---|
| *B41M 5/323* | (2006.01) | |
| *B41M 3/14* | (2006.01) | |
| *B41M 5/337* | (2006.01) | |
| *B42D 25/373* | (2014.01) | |
| *B42D 25/382* | (2014.01) | |
| *B42D 25/41* | (2014.01) | |
| *B41J 2/44* | (2006.01) | |
| *B41J 2/475* | (2006.01) | |
| *C09D 11/50* | (2014.01) | |
| *B41M 5/333* | (2006.01) | |
| *B42D 25/23* | (2014.01) | |
| *B42D 25/387* | (2014.01) | |

(52) U.S. Cl.
CPC .............. *B41M 5/323* (2013.01); *B41J 2/442* (2013.01); *B41J 2/4753* (2013.01); *B41M 3/142* (2013.01); *B41M 5/337* (2013.01); *B41M 5/3372* (2013.01); *B42D 25/373* (2014.10); *B42D 25/382* (2014.10); *B42D 25/41* (2014.10); *C09D 11/50* (2013.01); *B41M 5/3333* (2013.01); *B41M 2205/04* (2013.01); *B42D 25/23* (2014.10); *B42D 25/387* (2014.10)

(58) Field of Classification Search
CPC ........ B41M 3/14; B41M 3/142; B41M 5/323; B41M 5/333; B41M 5/337; B41M 5/46; B41M 5/465; B41M 2205/04; B41J 2/44; B41J 2/442; B42D 25/382; B42D 25/387
USPC ........................................ 503/207, 209, 208
See application file for complete search history.

(56) References Cited

U.S. PATENT DOCUMENTS

| | | | |
|---|---|---|---|
| 4,720,449 A | 1/1988 | Borror et al. | |
| 5,659,344 A | 8/1997 | Kagayama | |
| 6,452,873 B1 * | 9/2002 | Holt et al. ............. | G04B 17/00 368/27 |
| 2007/0072774 A1 | 3/2007 | Mori | |

FOREIGN PATENT DOCUMENTS

| | | |
|---|---|---|
| EP | 2 181 858 A1 | 5/2010 |
| EP | 2 567 825 A1 | 3/2013 |
| EP | 2 719 540 A1 | 4/2014 |
| EP | 2 719 541 A1 | 4/2014 |
| EP | 2 648 920 B1 | 3/2015 |
| JP | 07-304206 A | 11/1995 |

OTHER PUBLICATIONS

Official Communication issued in International Patent Application No. PCT/EP2016/060533, dated Aug. 9, 2016.

* cited by examiner

*Primary Examiner* — Bruce H Hess
(74) *Attorney, Agent, or Firm* — Keating and Bennett, LLP

(57) ABSTRACT

A laser markable composition includes (a) an aqueous medium; (b) polymeric particles dispersed in the aqueous medium; (c) a color developing agent or color developing agent precursor; and (d) an optothermal converting agent; characterized in that a leuco dye is covalently bonded to the polymeric particles.

15 Claims, No Drawings

LASER MARKABLE COMPOSITIONS, ARTICLES AND DOCUMENTS

CROSS REFERENCE TO RELATED APPLICATIONS

This application is a 371 National Stage Application of PCT/EP2016/060533, filed May 11, 2016. This application claims the benefit of European Application No. 15168097.2, filed May 19, 2015, which is incorporated by reference herein in its entirety.

BACKGROUND OF THE INVENTION

1. Field of the Invention

This invention relates to aqueous laser markable compositions and to articles made therefrom.

2. Description of the Related Art

Various substrates, for example paper, paperboard or plastics, are very often marked with information such as logos, bar codes, expiry dates or batch numbers.

Traditionally, the marking of these substrates has been achieved by various printing techniques, such as for example inkjet or thermal transfer printing. However, these printing techniques are more and more replaced by laser marking as laser marking is cheaper in terms of overall economics and shows performance benefits such as high speed and contact free marking, marking of substrates with uneven surfaces, creation of marks that are so small that they are invisible or nearly invisible to the human eye, and creation of marks in the substrate rather than on the substrates.

Security cards are widely used for various applications such as identification purposes (ID cards) and financial transfers (credit cards). Such cards typically consist of a laminated structure consisting of various paper or plastic laminates and layers wherein some of them may carry alphanumeric data and a picture of the card holder. So called 'smart cards' can also store digital information by including an electronic chip in the card body. A principal objective of such security cards is that they cannot be easily modified or reproduced in such a way that the modification or reproduction is difficult to distinguish from the original.

Laser marking is perceived a secure way to add information on a security document as it is capable of producing the information "inside" the security document.

Well known in the field of laser markable security documents is the use of laser markable polymeric supports. Laser marking produces a colour change from white to black in a laser markable support through carbonization of the polymer, usually polycarbonate as disclosed in e.g. EP-A 2181858.

During the past last years, there is an increased interest of using laser markable layers. The advantage of using a laser markable layer coated on a support instead of a laser markable support, is that a support can be used which has better physical properties than the laser markable supports, such as for example a higher flexibility than a polycarbonate support as disclosed in e.g. EP-A 2567825.

There is also an increased interest in using laser marking to produce coloured images, for example in security documents, but also in various other applications. Therefore, laser markable layers are used which are composed of colour forming compounds (also called "leuco-dyes") which can change from essentially colourless or pale-coloured to coloured when exposed to for example heat, such as disclosed in for example EP-A 2648920.

The colour laser markable layers may comprise an infrared absorbing dye (IR dye) or an infrared absorbing pigment (IR pigment), both absorbing the IR radiation and converting it into heat.

An advantage of using IR dyes is that the absorption spectrum of an IR dye tends to be narrower than that of an IR pigment. This allows the production of multicoloured articles and security documents from precursors having a plurality of laser markable layers containing different IR dyes and colour forming compounds. The IR dyes having a different maximum absorption wavelength can then be addressed by IR lasers with corresponding emission wavelengths causing colour formation only in the laser markable layer of the addressed IR dye. Such multicolour articles have been disclosed in for example U.S. Pat. No. 4,720,449, EP-A 2719540 and EP-A 2719541.

Laser marking may also be used to write personalized information onto various articles, such as mobile phones, cars, etc. Here, the major advantage of laser marking compared to for example printing techniques such as inkjet printing, flexographic printing or screen printing is the fact that the information is written "inside" the article instead of "on top" of the article.

A disadvantage of laser markable materials disclosed in for example EP-A 2719541 is the fact that the laser markable layers are prepared from non-aqueous coating solutions making their production more cumbersome regarding health and safety regulations.

Another problem of laser markable materials comprising a colour forming compound and a colour developer is often their poor daylight stability. When such articles are exposed to daylight for a long time, a background stain becomes more and more pronounced.

SUMMARY OF THE INVENTION

Preferred embodiments of the invention provide a laser markable article having a simplified and more environmentally friendly preparation method while maintaining or even improving their physical properties and daylight stability.

The preferred embodiments are realized with the colour laser markable composition defined below.

Further advantages and embodiments of the present invention will become apparent from the following description.

DETAILED DESCRIPTION OF THE PREFERRED EMBODIMENTS

Definitions

The terms polymeric support and foil, as used herein, mean a self-supporting polymer-based sheet, which may be associated with one or more adhesion layers, e.g. subbing layers. Supports and foils are usually manufactured through extrusion.

The term layer as used herein, is considered not to be self-supporting and is manufactured by coating or spraying it on a (polymeric) support or foil.

The term leuco dye as used herein refers to compounds which can change from essentially colourless or pale-coloured to coloured when irradiated with UV light, IR light and/or heated.

PET is an abbreviation for polyethylene terephthalate.

PETG is an abbreviation for polyethylene terephthalate glycol, the glycol indicating glycol modifiers which are incorporated to minimize brittleness and premature aging that occur if unmodified amorphous polyethylene terephthalate (APET) would be used in the production of cards.

PET-C is an abbreviation for crystalline PET, i.e. a biaxially stretched polyethylene terephthalate. Such a polyethylene terephthalate support has excellent properties of dimensional stability.

The definitions of security features correspond with the normal definition as adhered to in the Glossary of Security Documents—Security features and other related technical terms as published by the Consilium of the Council of the European Union on Aug. 25, 2008 (Version: v.10329.02.b.en) on its website: http://www.consilium.europa.eu/prado/EN/glossaryPopup.html.

The term security document precursor as used herein refers to the fact that one or more security features still have to be applied to the precursor, for example laser marking, in order to obtain the final security document.

The term alkyl means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl etc.

The term alkoxy means all variants possible for each number of carbon atoms in the alkyl group i.e. methoxy, ethoxy, for three carbon atoms: n-propoxy and isopropoxy; for four carbon atoms: n-butoxy, isobutoxy and tertiary-butoxy etc.

The term aryloxy means Ar—O— wherein Ar is an optionally substituted aryl group.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl group or a naphthyl group including one, two, three or more $C_1$ to $C_6$-alkyl groups.

Unless otherwise specified a substituted or unsubstituted alkaryl group is preferably a $C_1$ to $C_6$-alkyl group including an aryl group, preferably a phenyl group or naphthyl group.

Unless otherwise specified a substituted or unsubstituted aryl group is preferably a substituted or unsubstituted phenyl group or naphthyl group.

A cyclic group includes at least one ring structure and may be a monocyclic- or polycyclic group, meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulfur atoms, selenium atoms or combinations thereof.

An alicyclic group is a non-aromatic homocyclic group wherein the ring atoms consist of carbon atoms.

The term heteroaryl group means a monocyclic- or polycyclic aromatic ring comprising carbon atoms and one or more heteroatoms in the ring structure, preferably, 1 to 4 heteroatoms, independently selected from nitrogen, oxygen, selenium and sulfur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents. Preferably, a heteroaryl group is a monocyclic ring, wherein the ring comprises 1 to 5 carbon atoms and 1 to 4 heteroatoms.

The term substituted, in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl, a substituted heteroaryl and a substituted heterocyclic group are preferably substituted by one or more substituents selected from the group consisting of methyl, ethyl, n-propyl, isopropyl, n-butyl, 1-isobutyl, 2-isobutyl and tertiary-butyl, ester, amide, ether, thioether, ketone, aldehyde, sulfoxide, sulfone, sulfonate ester, sulfonamide, —Cl, —Br, —I, —OH, —SH, —CN and —$NO_2$.

Laser Markable Composition

The laser markable composition according to the present invention comprises (a) an aqueous medium;

(b) polymer particles dispersed in the aqueous medium, (c) a colour developing agent or colour developing agent precursor; and (d) an optothermal converting agent;

characterized in that a leuco dye is covalently bound to the polymer particles.

An aqueous composition within the meaning of the invention is a composition of which the liquid phase contains preferably at least 50 wt %, more preferably at least 75 wt %, most preferably at least 90 wt % of water.

Polymer Particles Comprising a Leuco Dye

In the laser markable composition of the present invention, a leuco dye is covalently bound to a polymer particle.

The polymer particles have an average particle diameter measured by dynamic laser diffraction of from 10 nm to 800 nm, preferably from 15 to 350 nm, more preferably from 20 to 150 nm, most preferably from 25 nm to 100 nm.

In a preferred embodiment of the invention, the polymer particle is a copolymer comprising a monomeric unit containing a leuco dye. The monomer containing the leuco dye is preferably used in combination with other monomers selected from the group consisting of ethylene, vinylchloride, methylacrylate, methylmethacrylate ethylacrylate, ethylmethacrylate, vinylidene chloride, acrylonitrile, methacrylonitrile, vinylcarbazole, or styrene.

According to a preferred embodiment the monomer containing the leuco dye is preferably used in combination with styrene or derivatives thereof, mixtures comprising styrene and (meth)acrylonitrile or derivatives thereof.

The amount of monomers containing a leuco dye relative to the total weight of the polymer particles is preferably between 2 and 30 wt %, more preferably between 5 and 15 wt %. The amount of monomers containing a leuco dye is typically optimized in order to obtain sufficient colour formation upon exposure to heat or IR radiation.

The polymer particles are preferably prepared by an emulsion polymerization. Emulsion polymerization is typically carried out through controlled addition of several components—i.e. vinyl monomers, surfactants (dispersion aids), initiators and optionally other components such as buffers or protective colloids—to a continuous medium, usually water. The resulting polymer of the emulsion polymerization is a dispersion of discrete particles in water. The surfactants or dispersion aids which are present in the reaction medium have a multiple role in the emulsion polymerization: (1) they reduce the interfacial tension between the monomers and the aqueous phase, (2) they provide reaction sites through micelle formation in which the polymerization occurs and (3) they stabilize the growing polymer particles and ultimately the latex emulsion. The surfactants are adsorbed at the water/polymer interface and thereby prevent coagulation of the fine polymer particles. A wide variety of surfactants are used for the emulsion polymerisation. In general, a surfactant molecule contains both polar (hydrophilic) and non-polar (hydrophobic or lipophilic) groups. The most used surfactants are anionic or non-ionic surfactants. Widely used anionic surfactants are, alkylsulfates, alkyl ether sulfates, alkyl ether carboxylates, alkyl or aryl sulfonates, alkyl phosphates or alkyl ether phosphates. An example of an alkyl sulfate surfactant is sodium lauryl sulfate (e.g. Texapon K12 by the company Cognis). An example of an alkyl ether sulfate surfactant is laureth-2 sulfate sodium salt (e.g. Empicol ESB form the company Huntsman). An example of an alkyl ether carboxylate is laureth-6 carboxylate (e.g. Akypo RLM45 from the company Kao Chemicals). An example of an alkyl ether phosphate is Trideceth-3 phosphate ester (e.g. Chemfac PB-133 from the company Chemax Inc.).

The critical micelle concentration (C.M.C.) of the used surfactants is an important property to control the particle nucleation and consequently the particle size and stabilization of the polymer particles. The C.M.C. can be varied by variation of the degree of ethoxylation of the surfactant. Alkyl ether sulfates having a different degree of ethoxylation are for example Empicol ESA (Laurette-1 sulfate sodium salt), Empicol ESB (Laurette-2 sulfate sodium salt) and Empicol ESC (Laurette-3 sulfate sodium salt). Alkyl ether carboxylates having a different degree of ethoxylation are for example Akypo RLM-25 (Laurette-4 carboxylic acid), Akypo RLM-45 (Laurette-6 carboxylic acid) and Akypo RLM-70 (Laurette-8 carboxylic acid). Alkyl ether phosphates having a different degree of ethoxylation are for example Chemfac PB-133 (Trideceth-3 phosphate ester, acid form), Chemfac PB-136 (Trideceth-6-phosphate ester, acid form) and Chemfac PB-139 (Trideceth-9-phosphate ester, acid form).

The carboxylate and phosphate ester surfactants are usually supplied in the acid form. In order to prepare an aqueous solution of these surfactants, a base such as NaOH, $Na_2CO_3$, $NaHCO_3$, $NH_4OH$, or $NH_4HCO_3$ must be added.

In a preferred embodiment, the polymer particles are prepared by emulsion polymerization in the presence of a surfactant selected from alkyl phosphates and alkyl ether phosphates.

Instead of using surfactants to stabilize the polymer particles, self-dispersible polymer particles may also be used. In preparing self-dispersing polymer particles, preferably a monomer is used selected from the group consisting of a carboxylic acid monomer, a sulfonic acid monomer, and a phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, and bis(methacryloxyethyl)phosphate. Such monomers may be incorporated into polyurethane copolymers which include a (meth)acrylate polymeric chain.

Besides traditional emulsion polymerization wherein nucleation, i.e. initiation of the polymerization, is done via micellar or homogeneous nucleation, the so-called mini-emulsion polymerization, may also be used to prepare the polymer particles. In emulsion polymerization, the nucleation occurs in the monomer droplet. See for example "Emulsion Polymerization and Emulsion Polymers", edited by Peter A. Lovell and Mohamed S. El-AASSER, 1997, page 42-43, wherein the different types of emulsion polymerization are described in more detail.

A mini-emulsion polymerization method is described in for example by TANG et al. in Journal of Applied Polymer Science, Volume 43, pages 1059-1066 (1991) and by Blythe et al. in Macromolecules, 1999, 32, 6944-6951.

Instead of using a monomer containing a leuco dye in a co-polymerization reaction to form the polymer particles, a leuco dye may also be covalently bonded to a already formed polymer particle, when reactive groups are present on the polymer particles which can react with a reactive leuco dye. To increase the efficiency of such a reaction, the reactive leuco dye may be added in a solvent which swells the polymer particles. That solvent may then be subsequently evaporated.

Optothermal Converting Agent

An optothermal converting agent generates heat upon absorption of radiation. The optothermal converting agent preferably generates heat upon absorption of infrared radiation.

The optothermal converting agent is preferably an infrared absorbing dye, an infrared absorbing pigment, or a combination thereof.

Infrared Absorbing Dyes

Suitable examples of infrared absorbing dyes (IR dyes) include, but are not limited to, polymethyl indoliums, metal complex IR dyes, indocyanine green, polymethine dyes, croconium dyes, cyanine dyes, merocyanine dyes, squarylium dyes, chalcogeno-pyryloarylidene dyes, metal thiolate complex dyes, bis(chalcogenopyrylo)-polymethine dyes, oxyindolizine dyes, bis(aminoaryl)polymethine dyes, indolizine dyes, pyrylium dyes, quinoid dyes, quinone dyes, phthalocyanine dyes, naphthalo-cyanine dyes, azo dyes, (metalized) azomethine dyes and combinations thereof.

Preferred infrared absorbing dyes are polymethine dyes due to their low absorption in the visible region and their selectivity, i.e. narrow absorption peak in the infrared region. Particular preferred polymethine infrared dyes are cyanine infrared dyes.

Preferred infrared absorbing dyes having an absorption maximum of more than 1100 nm are those disclosed in EP-A 2722367, paragraphs [0044] to [0083] and the unpublished EP-A 14166498.7 (filed on 30 Apr. 2014).

Infrared absorbing dyes having an absorption maximum between 1000 nm and 1100 nm are preferably selected from the group consisting of quinoline dyes, indolenine dyes, especially a benzo[cd]indoline dye. A particularly preferred infrared dye is 5-[2,5-bis[2-[1-(1-methylbutyl)-benz[cd]indol-2(1H)-ylidene]ethylidene]-cyclopentylidene]-1-butyl-3-

(2-methoxy-1-methylethyl)-2,4,6(1H,3H,5H)-pyrimidin-etrione (CASRN 223717-84-8) represented by the Formula IR-1:

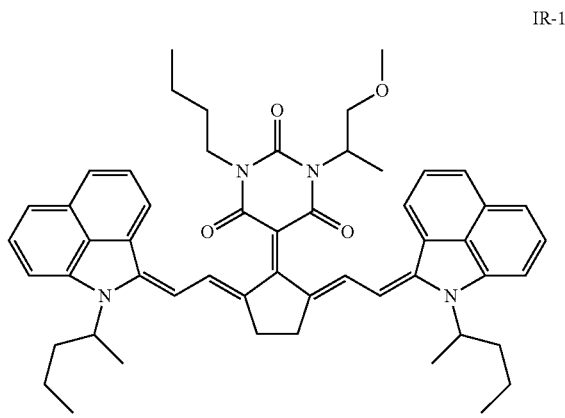 [SMILES: CCCCN1C(=O)C(=C2/C(=C/C=c3\c4cccc5cccc(c54)n3C(C)CCC)CC/C2=C\C=c2/c3cccc4cccc(c43)n2C(C)CCC)C(=O)N(C(C)COC)C1=O]

IR-1

The infrared absorbing dyes IR-1 has an absorption maximum $\lambda_{max}$ of 1052 nm making it very suitable for a Nd-YAG laser having an emission wavelength of 1064 nm.

Infrared absorbing dyes having an absorption maximum between 830 nm and 1000 nm are preferably selected from the group consisting of quinoline dyes, indolenine dyes, especially benzo[e]indolenine dyes, and benzo[f]indolenine dyes.

An advantage of using infrared absorbing dyes is that the absorption spectrum of an infrared absorbing dye tends to be narrower than that of an Infrared absorbing pigment. This allows the production of multicoloured articles and security documents from precursors having a plurality of laser markable layers containing different IR dyes and colour foming compounds. The IR dyes having a different maximum absorption wavelength can then be addressed by IR lasers with corresponding emission wavelengths causing colour formation only in the laser markable layer of the addressed IR dye. Such multicolour articles have been disclosed in for example U.S. Pat. No. 4,720,449, EP-A 2719540 and EP-A 2719541.

The amount of the IR dyes is preferably between 0.005 and 1.000 g/m$^2$, more preferably between 0.010 and 0.500 g/m$^2$, most preferably between 0.015 and 0.050 g/m$^2$. Enough IR dye has to be present to ensure sufficient colour density formation upon exposure to IR radiation. However, using too much IR dye may result in unwanted background colouration of the laser markable materials.

Water soluble infrared dyes can be added as such to the aqueous composition. However, preferred infrared dyes are often not, or slightly, soluble in aqueous media. Such infrared dyes are preferably added to the laser markable composition as an aqueous dispersion or emulsion.

Infrared Absorbing Pigments

Suitable examples of infrared absorbing pigments include but are not limited to carbon black such as acetylene black, channel black, furnace black, lamp black, and thermal black; oxides, hydroxides, sulfides, sulfates and phosphates of metals such as copper, bismuth, iron, nickel, tin, zinc, manganese, zirconium, tungsten, lanthanum, and antimony including lanthane hexaboride, indium tin oxide (ITO) and antimony tin oxide, titanium black and black iron oxide.

The infrared dye classes disclosed above may also be used as infrared absorbing pigments, for example cyanine pigment, merocyanine pigment, etc.

A preferred infrared absorbing pigment is carbon black.

The particle size of the pigment is preferably from 0.01 to 5 μm, more preferably from 0.05 to 1 μm.

The amount of the infrared absorbing pigment is between 10 and 1000 ppm, preferably between 25 and 750 ppm, more preferably between 50 and 500 ppm, most preferably between 100 and 250 ppm, all relative to the total dry weight of the laser markable layer. An amount of infrared absorbing pigment above 1000 ppm results in a too high background density of the laser markable article.

Aqueous dispersions of carbon black are preferably used in the present invention. Examples of such aqueous carbon black dispersions are CAB-O-JET® 200 and 300 from CABOT.

Colour Developing Agent

Upon absorption of infrared radiation, the optothermal converting agent converts that radiation into heat. The heat may render the polymer particles more penetrable whereupon the leuco dye may comes into reactive contact with a colour developing agent which then triggers the colour formation.

For example polymer particles in the laser markable composition having a glass transition temperature (Tg) above room temperature are not or slightly penetrable by the colour developing agent or colour developing agent precursor before exposure to infrared radiation. After exposure to IR radiation, the polymer particles may become more penetrable because the temperature in the laser markable composition may rise above the Tg of the polymer particles.

Various electron accepting substances may be used as colour developing agent in the present invention. Examples thereof include phenolic compounds, organic or inorganic acidic compounds and esters or salts thereof.

Specific examples include bisphenol A; tetrabromobisphenol A; gallic acid; salicylic acid; 3-isopropyl salicylate; 3-cyclohexyl salicylate; 3-5-di-tert-butyl salicylate; 3,5-di-α-methyl benzyl salicylate; 4,4'-isopropylidenediphenol; 1,1'-isopropylidene bis(2-chlorophenol); 4,4'-isopropylene bis(2,6-dibromo-phenol); 4,4'-isopropylidene bis(2,6-dichlorophenol); 4,4'-isopropylidene bis(2-methyl phenol); 4,4'-isopropylidene bis(2,6-dimethyl phenol); 4,4'-isopropylidene bis(2-tert-butyl phenol); 4,4'-sec-butylidene diphenol; 4,4'-cyclohexylidene bisphenol; 4,4'-cyclohexylidene bis(2-methyl phenol); 4-tert-butyl phenol; 4-phenyl phenol; 4-hydroxy diphenoxide; α-naphthol; β-naphthol; 3,5-xylenol; thymol; methyl-4-hydroxybenzoate; 4-hydroxy-acetophenone; novolak phenol resins; 2,2'-thio bis(4,6-dichloro phenol); catechol; resorcin; hydroquinone; pyrogallol; fluoroglycine; fluoroglycine carboxylate; 4-tert-octyl catechol; 2,2'-methylene bis(4-chlorophenol); 2,2'-methylene bis(4-methyl-6-tert-butyl phenol); 2,2'-dihydroxy diphenyl; ethyl p-hydroxybenzoate; propyl p-hydroxybenzoate; butyl p-hydroxy-benzoate; benzyl p-hydroxybenzoate; p-hydroxybenzoate-p-chlorobenzyl; p-hydroxybenzoate-o-chlorobenzyl; p-hydroxybenzoate-p-methylbenzyl; p-hydroxybenzoate-n-octyl; benzoic acid; zinc salicylate; 1-hydroxy-2-naphthoic acid; 2-hydroxy-6-naphthoic acid; 2-hydroxy-6-zinc naphthoate; 4-hydroxy diphenyl sulphone; 4-hydroxy-4'-chloro diphenyl sulfone; bis(4-hydroxy phenyl)sulphide; 2-hydroxy-p-toluic acid; 3,5-di-tert-zinc butyl salicylate; 3,5-di-tert-tin butyl salicylate; tartaric acid; oxalic acid; maleic acid; citric acid; succinic acid; stearic acid; 4-hydroxyphthalic acid; boric acid; thiourea derivatives; 4-hydroxy thiophenol derivatives; bis(4-hydroxyphenyl)acetate; bis(4-hydroxyphenyl)ethyl acetate; bis(4-hydroxyphenyl) acetate-n-propyl; bis(4-hydroxy-phenyl)acetate-n-butyl; bis(4-hydroxyphenyl)phenyl acetate; bis(4-hydroxyphenyl)- benzyl acetate; bis(4-hydroxyphenyl)phenethyl acetate; bis(3-methyl-4-hydroxy-phenyl)acetate; bis(3-methyl-4-hydroxy-phenyl)methyl acetate; bis(3-methyl-4-hydroxyphenyl)acetate-n-propyl; 1,7-bis(4-hydroxyphenylthio)3,5-dioxaheptane; 1,5-bis(4-hydroxyphenylthio)3-oxaheptane; 4-hydroxy phthalate dimethyl; 4-hydroxy-4'-methoxy diphenyl sulfone; 4-hydroxy-4'-ethoxy diphenyl sulfone; 4-hydroxy-4'-isopropoxy diphenyl sulfone; 4-hydroxy-4'-propoxy diphenyl sulfone; 4-hydroxy-4'-butoxy diphenyl sulfone; 4-hydroxy-4'-isopropoxy diphenyl sulfone; 4-hydroxy-4'-sec-butoxy diphenyl sulfone; 4-hydroxy-4'-tert-butoxy diphenyl sulfone; 4-hydroxy-4'-benzyloxy diphenyl sulfone; 4-hydroxy-4'-phenoxy diphenyl sulfone; 4-hydroxy-4'-(m-methyl benzoxy) diphenyl sulfone; 4-hydroxy-4'-(p-methyl benzoxy)diphenyl sulfone; 4-hydroxy-4'-(o-methyl benzoxy)diphenyl sulfone; 4-hydroxy-4'-(p-chloro benzoxy)diphenyl sulfone and 4-hydroxy-4'-oxyaryl diphenyl sulfone.

A preferred colour developing agent is a metal salt of salicylate, for example zinc salicylate. A particularly preferred colour developing agent is zinc 3,5-bis(α-methylbenzyl) salicylate.

When the colour developing agent is not, or slightly, soluble in aqueous media, it is preferred to add such a colour developing agent as an aqueous dispersion or emulsion.

Colour Developing Agent Precursor

Also a so-called colour developing agent precursor may be used. Such a precursor forms a colour developing agent upon exposure to heat. Using a colour developing agent precursor instead of a colour developer agent may result in a better UV and heat stability of the laser markable composition.

When the colour developing agent precursor is not, or slightly, soluble in aqueous media, it is preferred to add such a colour developing agent precursor as an aqueous dispersion or emulsion.

All publicly-known thermal acid generators can be used as colour developing agent precursors. Thermal acid generators are for example widely used in conventional photoresist material. For more information see for example "Encyclopaedia of polymer science", 4$^{th}$ edition, Wiley or "Industrial Photoinitiators, A Technical Guide", CRC Press 2010.

Preferred classes of photo- and thermal acid generators are iodonium salts, sulfonium salts, ferrocenium salts, sulfonyl oximes, halomethyl triazines, halomethylarylsulfone, α-haloacetophenones, sulfonate esters, t-butyl esters, allyl substituted phenols, t-butyl carbonates, sulfate esters, phosphate esters and phosphonate esters.

Preferred colour developing agent precursors are the acid generating compounds having a structure according to Formula (I) or Formula (II):

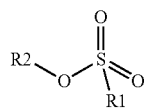

Formula I

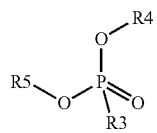

Formula II wherein

R1 and R3 independently represent an optionally substituted alkyl group, an optionally substituted (hetero)cyclic alkyl group, an optionally substituted alkanyl group, an optionally substituted alkenyl group, an optionally substituted alkynyl group, an optionally substituted (hetero)aryl group, an optionally substituted aralkyl group, an optionally substituted alkoxy group, an optionally substituted (hetero)cyclic alkoxy group, or an optionally substituted (hetero)aryl group.

R2, R4 and R5 independently represent an optionally substituted alkyl, an optionally substituted aliphatic (hetero) cyclic alkyl group or an optionally substituted aralkyl group; R1 and R2, R4 and R5, R3 and R4, and R3 and R5 may represent the necessary atoms to form a ring.

Suitable alkyl groups include 1 or more carbon atoms such as for example $C_1$ to $C_{22}$-alkyl groups, more preferably $C_1$ to $C_{12}$-alkyl groups and most preferably $C_1$ to $C_6$-alkyl groups. The alkyl group may be linear or branched such as for example methyl, ethyl, propyl (n-propyl, isopropyl), butyl (n-butyl, isobutyl, t-butyl), pentyl, 1,1-dimethyl-propyl, 2,2-dimethylpropyl and 2-methyl-butyl, or hexyl.

Suitable cyclic alkyl groups include cyclopentyl, cyclohexyl or adamantyl.

Suitable heterocyclic alkyl groups include tetrahydrofuryl, piperidinyl, pyrrolidinyl, dioxyl, tetrahydrothiophenyl, silolanyl, or thianyl oxanyl.

Suitable aryl groups include for example phenyl, naphthyl, benzyl, tolyl, ortho- meta- or para-xylyl, anthracenyl or phenanthrenyl.

Suitable heteroaryl groups include monocyclic- or polycyclic aromatic rings comprising carbon atoms and one or more heteroatoms in the ring structure. Preferably 1 to 4 heteroatoms independently selected from nitrogen, oxygen, selenium and sulphur and/or combinations thereof. Examples include pyridyl, pyrimidyl, pyrazoyl, triazinyl, imidazolyl, (1,2,3)- and (1,2,4)-triazolyl, tetrazolyl, furyl, thienyl, isoxazolyl, thiazolyl and carbazoyl.

Suitable alkoxy groups include those containing from 1 to 18, preferably 2 to 8 carbon atoms, such as ethoxide, propoxide, isopropoxide, butoxide, isobutoxide and tert-butoxide.

Suitable aryloxy groups include phenoxy and naphthoxy.

The alkyl, (hetero)cyclic alkyl, aralkyl, (hetero)aryl, alkoxy, (hetero)cyclic alkoxy, or (hetero)aryloxy groups may include one or more substituents. The optional substituents are preferably selected from an alkyl group such as a methyl, ethyl, n-propyl, isopropyl, n-butyl, 1-isobutyl, 2-isobutyl and tertiary-butyl group; an ester, amide, ether, thioether, ketone, aldehyde, sulfoxide, sulfone, sulfonate ester or sulfonamide group, a halogen such as fluorine, chlorine, bromine or iodine, —OH, —SH, —CN and —NO$_2$, and/or combinations thereof.

R1 preferably represents a $C_1$ to $C_{22}$-alkyl group, an aliphatic alkoxide group containing 2 to 8 carbons, a phenyl group or a tolyl group. R1 most preferably represents a tolyl group.

R2 preferably represents a $C_1$ to $C_{22}$-alkyl group or a (hetero)cyclic alkyl group. R2 most preferably represents a cyclohexyl group.

R3 preferably represents a $C_1$ to $C_{22}$-alkyl group, an aliphatic alkoxide group containing 2 to 8 carbons or a benzyl group.

In a preferred embodiment, R4 and R5 independently represent a $C_1$ to $C_{22}$-alkyl group. In a preferred embodiment, R4 and R5 represent independently an isobutyl, t-butyl, isopropyl, 2-ethylhexyl or a linear $C_2$ to $C_8$-alkyl group.

The compound used in the present invention can be a monomer, an oligomer (i.e. a structure including a limited amount of monomers such as two, three or four repeating units) or a polymer (i.e. a structure including more than four repeating units).

The compound used in the present invention contains at least one moiety according to Formula I and/or Formula II, preferably 1 to 150 moieties according to Formula I and/or Formula II. According to a preferred embodiment, the compound according to Formula I or Formula II may be present in a side chain of a polymer In the embodiment wherein the compound according to Formula I or Formula II is present in the side chain of a polymer, the following moiety (Formula III, IV or V) is preferably attached to the polymer:

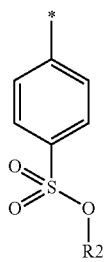

Formula III

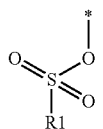

Formula IV

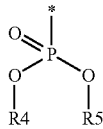

Formula V wherein

* denotes the linking to the polymer and

R1, R2, R4 and R5 as described above.

In the embodiment wherein the compound according to Formula I is present in the side chain of a polymer, the polymer is more preferably obtained from the coupling of a polymer or copolymer bearing side chains with alcohol groups and a sulfonyl chloride.

In the embodiment wherein the compound according to Formula I is present in the side chain of a polymer, the polymer is most preferably obtained from the coupling of a polymer or copolymer bearing side chains with alcohol groups and tosyl chloride. Useful polymers bearing side chains with alcohol include for example polyvinyl alcohol, polyvinyl butyral, cellulose derivatives, homo- and copolymers of 2-hydroxyethyl methacrylate, 2-hydroxyethyl acrylate, polysiloxane derivatives such as copolymers of hydroxyalkyl-methylsiloxane, and novolac resins.

Examples of acid generating compounds according to the present invention are shown in Table 1.

TABLE 1

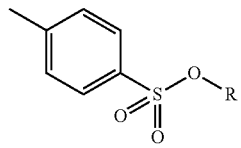

wherein R represents an alkyl group, preferably a tertiary butyl group.

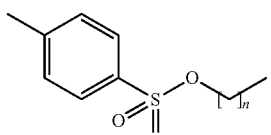

with n = 1-50

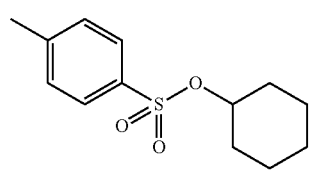 [SMILES: Cc1ccc(S(=O)(=O)OC2CCCCC2)cc1]

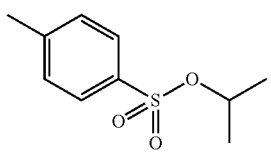

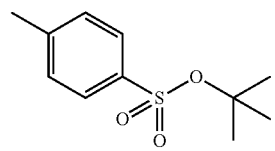

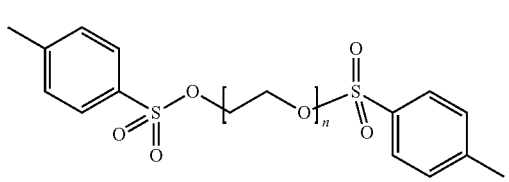

with n = 1-10000

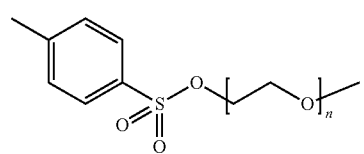

with n = 1-10000

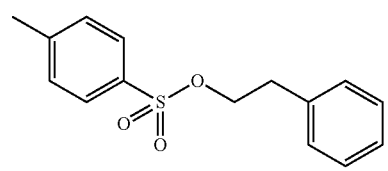 [SMILES: Cc1ccc(S(=O)(=O)OCCc2ccccc2)cc1]

TABLE 1-continued
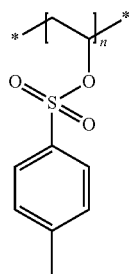
with n = 1-10000 and copolymers thereof
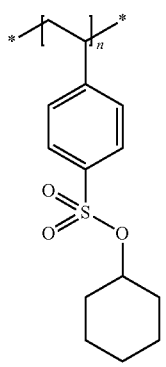
with n = 1-10000 and copolymers thereof
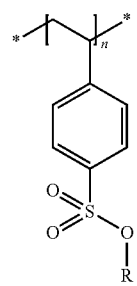
with n = 1-10000 and copolymers thereof and R represents an alkyl group, preferably a tertiary butyl group
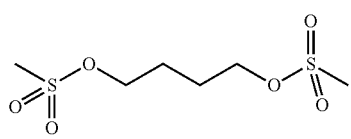
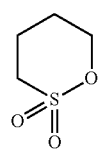
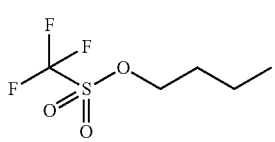
TABLE 1-continued
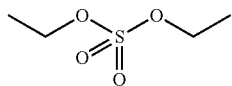
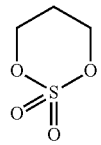
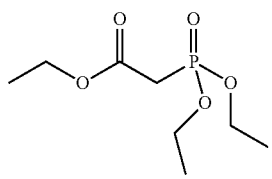
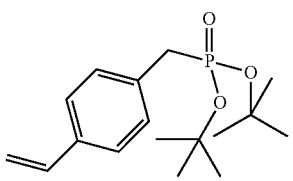 [SMILES: C=Cc1ccc(CP(=O)(OC(C)(C)C)OC(C)(C)C)cc1]
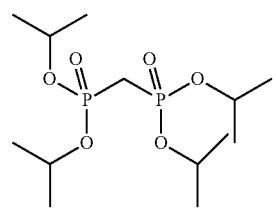 [SMILES: CC(C)OP(=O)(CP(=O)(OC(C)C)OC(C)C)OC(C)C]
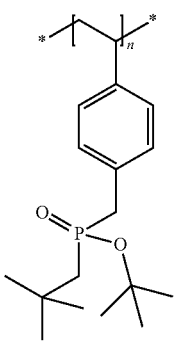
with n = 1-10000 and copolymers thereof
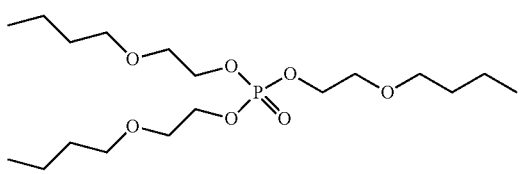 [SMILES: CCCCOCCOP(=O)(OCCOCCCC)OCCOCCCC]
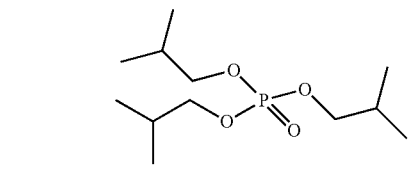 [SMILES: CC(C)COP(=O)(OCC(C)C)OCC(C)C]

TABLE 1-continued

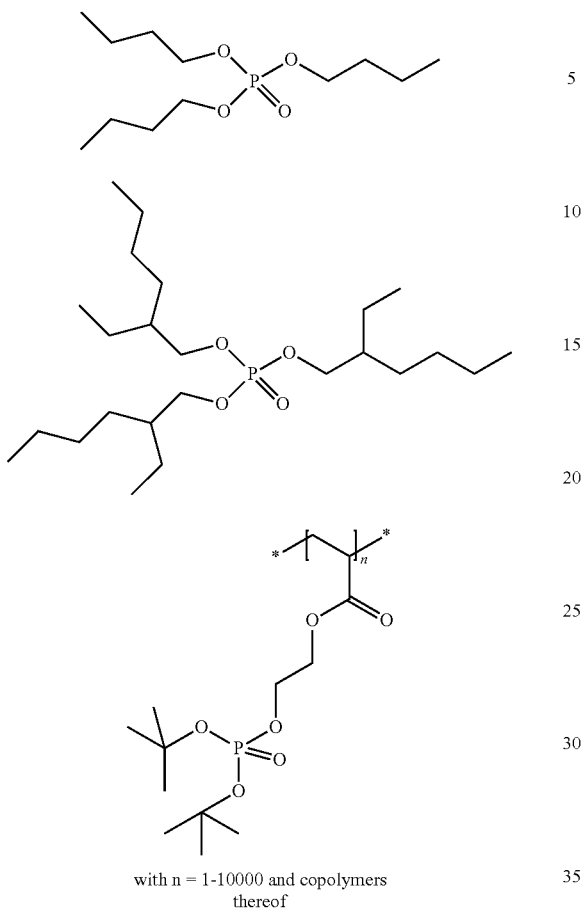

with n = 1-10000 and copolymers thereof

TABLE 2

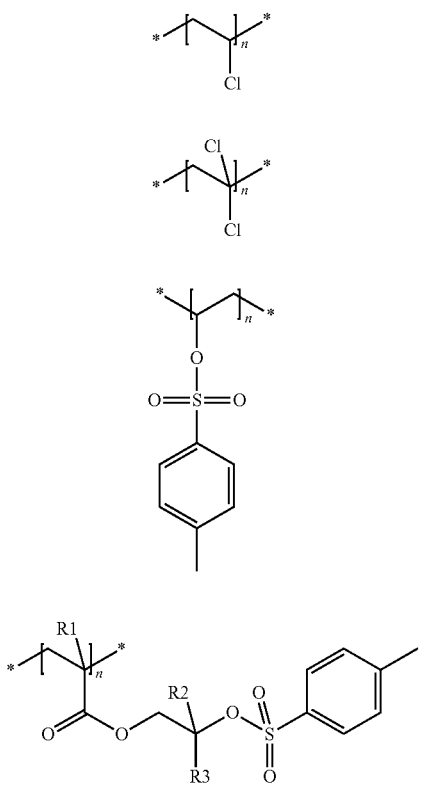

wherein R1, R2 and R3 independently represent hydrogen or alkyl groups

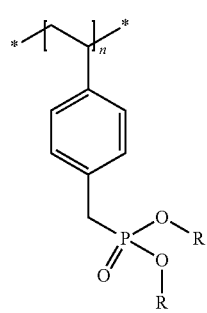

wherein R represents an alkyl group, preferably a tertiary butyl group

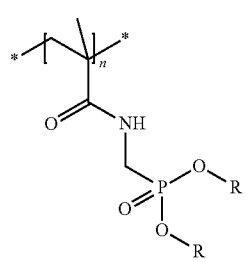

wherein R represents an alkyl group, preferably a tertiary butyl group

Other classes of photo- and thermal acid generators are iodonium salts, sulfonium salts, ferrocenium salts, sulfonyl oximes, halomethyl triazines, halomethyl-arylsulfone, α-haloacetophenones, sulfonate esters, t-butyl esters, allyl substituted phenols, t-butyl carbonates, sulfate esters, phosphate esters and phosphonate esters.

According to preferred embodiment of the invention, the colour developing agent precursor is a polymer particle, which is capable of forming an acid upon exposure to heat.

The acid liberated upon exposure to heat within the meaning of the invention includes Arrhenius acids, Brønsted-Lowry acids, and Lewis acids.

The polymer particles, which are capable of forming an acid upon exposure to heat may have two functions:
 a colour developing agent precursor, which liberates an acid upon exposure to heat, and
 film forming binder.

The polymer particles comprise repeating units, which are capable of generating an acid upon exposure to heat. Typically, exposure to heat may cause a fragmentation reaction resulting in an acid formation. The resulting acid may be a low molecular weight molecule formed by the fragmentation reaction or the acid may reside on the polymer particle after a fragmentation reaction. Table 2 depicts (part of) polymeric acid precursors, more specific the repeating unit that is able to generate an acid upon thermal treatment.

TABLE 2-continued

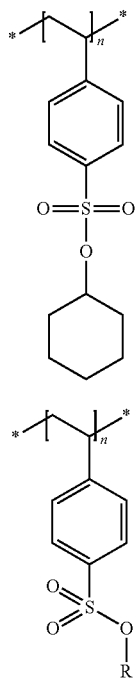

wherein R represents an alkyl group, preferably a tertiary butyl group

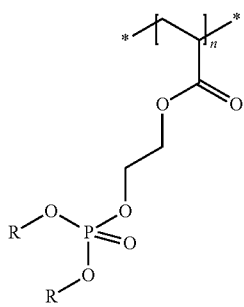

wherein R represents an alkyl group, preferably a tertiary butyl group

According to a preferred embodiment of the invention, the polymeric particles are capable of releasing a low molecular weight acid.

A particularly preferred polymer particle is a polyvinylidenechloride (PVDC) polymer particle. Upon exposure to heat, such a polymer particle is capable of releasing HCl.

The polyvinylidenechloride (PVDC) particle is preferably a vinylidene chloride copolymer comprising 90 wt % or less of vinylidene chloride based on the total weight of the binder.

When the amount of vinylidene chloride is above 90 wt % based on the total weight of the binder, the crystallinity of the binder becomes too high resulting in poor film forming property. Copolymerizaton of vinylidene chloride with further monomers renders the copolymer more amorphous and thus more soluble in the liquid carrier.

The vinylidene chloride copolymer preferably comprises a further monomer selected from the group consisting of vinyl chloride, alkyl acrylate, alkyl methacrylate, vinylether, vinylacetate, vinyl alcohol, acrylonitrile, methacrylonitrile, maleic acid, maleic anhydride, itaconic acid.

The vinylidene chloride copolymer more preferably comprises a further monomer selected from the group consisting of vinyl chloride, acrylonitrile, maleic acid, maleic anhydride and an alkyl acrylate.

The alkyl acrylate and alkyl methacrylate referred to above is preferably a C1-C10 alkyl acrylate or methacrylate. Particular preferred alkyl acrylates or alkyl methacrylates are methyl and butyl acrylate or methyl and butyl methacrylate.

Water based vinylidene copolymers may also be used in the present invention. Examples of such copolymers are Daran® 8730, Daran®8550, Daran® SL112, Daran® SL143, Daran® SL159 or Daran®8100, all commercially available from Owensboro Specialty Polymers; Diofan®193D, Diofan® P520, Diofan® P530 all commercially available from Solvay.

A PVDC copolymer may be characterized by the so-called dehydrochlorination constant (DHC). The amount of HCl liberated by a specific PVDC copolymer at a specified temperature during a specific time is measured.

The amount of polymer particle in the laser markable composition is preferably between 5 and 75 wt %, more preferably between 7.5 and 50 wt %, most preferably between 10 and 40 wt %, relative to the total weight of the laser markable composition. After applying and drying the composition on a support, the amount of polymer particles is preferably between 50 and 95 wt %, more preferably between 65 and 90 wt %, most preferably between 75 and 85 wt %, relative to the total dry weight of the laser markable composition.

Leuco Dyes

All publicly-known leuco dyes can be used and are not restricted. They are for example widely used in conventional pressure-sensitive, photosensitive or thermally-sensitive recording materials. For more information about leuco dyes, see for example Chemistry and Applications of Leuco Dyes, Ramaiah Muthyala, Plenum Press, 1997.

A number of classes of leuco dyes may be used as colour forming compounds in the present invention, such as for example: spiropyran leuco dyes such as spirobenzopyrans (e.g. spiroindolinobenzopyrans, spirobenzo-pyranobenzopyrans, 2,2-dialkylchromenes), spironaphtooxazine and spirothiopyran; leuco quinone dyes; azines such as oxazines, diazines, thiazines and phenazine; phthalide- and phthalimidine-type leuco dyes such as triarylmethane phtalides (e.g. crystal violet lactone), diarylmethane phthalides, monoarylmethane phthalides, heterocyclic substituted phthalides, alkenyl substituted phthalides, bridged phthalides (e.g. spirofluorene phthalides and spirobenzanthracene phthalides) and bisphthalides; fluoran leuco dyes such as fluoresceins, rhodamines and rhodols; triarylmethanes such as leuco crystal violet; ketazines; barbituric acid leuco dyes and thiobarbituric acid leuco dyes.

The leuco dye is preferably present in the laser markable layer in an amount of 0.05 to 5.00 g/m², more preferably in an amount of 0.10 to 3.00 g/m², most preferably in an amount of 0.20 to 1.00 g/m².

The following reaction mechanisms and leuco dyes are suitable to form a coloured dye.

1. Protonation of a Leuco Dye after Fragmentation of an Acid Generator

The reaction mechanism can be represented by:

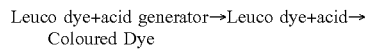

Preferred leuco dyes are phthalide- and phthalimidine-type leuco dyes such as triarylmethane phthalides, diarylmethane phthalides, monoarylmethane phthalides, heterocyclic substituted phthalides, alkenyl substituted phthalides, bridged phthalides (e.g. spirofluorene phthalides and spirobenzanthracene phthalides) and bisphthalides; and fluoran leuco dyes such as fluoresceins, rhodamines and rhodols.

In a more preferred embodiment of the present invention, a combination is used of at least one compound selected from the group consisting of CASRN 50292-95-0, CASRN 89331-94-2, CASRN1552-42-7 (crystal violet lactone), CASRN148716-90-9, CASRN 630-88-6, CASRN 36889-76-7 or CASRN 132467-74-4 as the Leuco Dye and at least one compound selected from the group consisting of CASRN 58109-40-3, CASRN 300374-81-6, CASRN 1224635-68-0, CASRN 949-42-8, CASRN 69432-40-2, CASRN 3584-23-4, CASRN 74227-35-3, CASRN 953-91-3 or CASRN6542-67-2 as acid generator.

2. Oxidation of a Triarylmethane Leuco Dye

The reaction mechanism can be represented by:

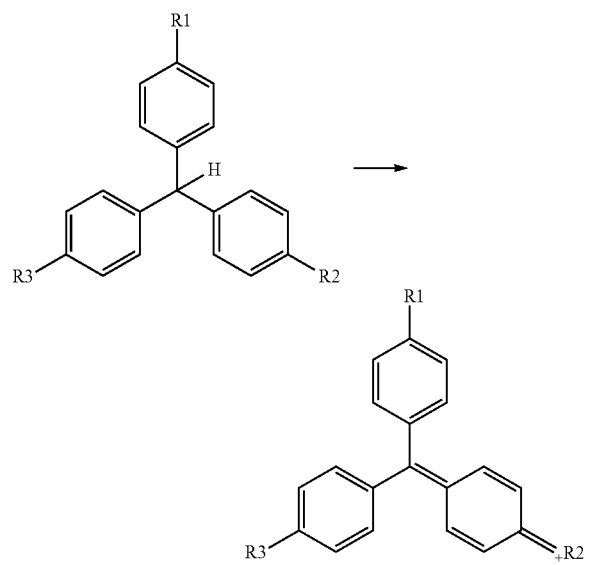

wherein R1, R2 and R3 each independently represent an amino group, an optionally substituted mono- or dialkylamino group, a hydroxyl group or an alkoxy group. R1 and R3 also each independently represent a hydrogen atom or an optionally substituted alkyl, aryl, or heteroaryl group. A preferred leuco dye for the present invention is leuco crystal violet (CASRN 603-48-5).

3. Oxidation of a Deuco Quinone Dye

The reaction mechanism can be represented by

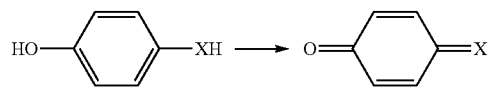

wherein X represents an oxygen atom or an optionally substituted amino or methine group.

4. Fragmentation of a Leuco Dye

The reaction mechanism can be represented by:

Leuco Dye-FG→Dye wherein FG represents a fragmenting group.

Preferred leuco dyes are oxazines, diazines, thiazines and phenazine. A particularly preferred leuco dye (CASRN104434-37-9) is shown in EP 174054 (POLAROID) which discloses a thermal imaging method for forming colour images by the irreversible unimolecular fragmentation of one or more thermally unstable carbamate moieties of an organic compound to give a visually discernible colour shift from colourless to coloured.

The fragmentation of a leuco dye may be catalyzed or amplified by acids, photo acid generators, and thermal acid generators.

5. Ring Opening of Spiropyran Leuco Dyes

The reaction mechanism can be represented by:

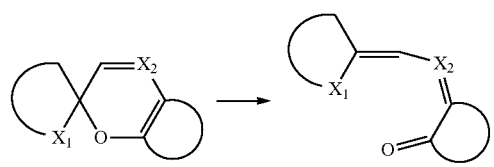

wherein $X_1$ represents an oxygen atom, an amino group, a sulfur atom or a selenium atom and $X_2$ represents an optionally substituted methine group or a nitrogen atom.

The preferred spiropyran leuco dyes for the present invention are spiro-benzopyrans such as spiroindolinobenzopyrans, spirobenzopyranobenzopyrans, 2,2-dialkylchromenes; spironaphtooxazines and spirothiopyrans. In a particularly preferred embodiment, the spiropyran leuco dyes are CASRN 160451-52-5 or CASRN 393803-36-6. The ring opening of a spiropyran leuco dye may be catalyzed or amplified by acids, photo acid generators, and thermal acid generators.

In a preferred embodiment of a laser markable layer for producing a cyan colour, the cyan colour forming compound has a structure according to Formulae CCFC1, CCFC2 or CCFC3.

CCFC1

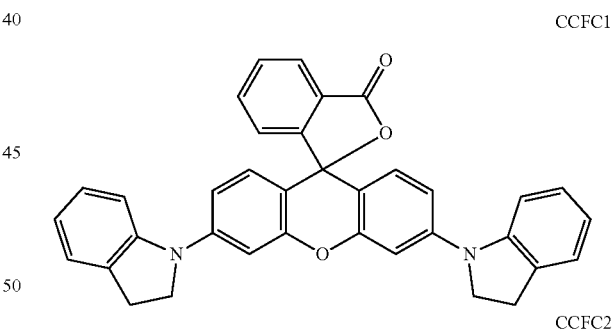

CCFC2

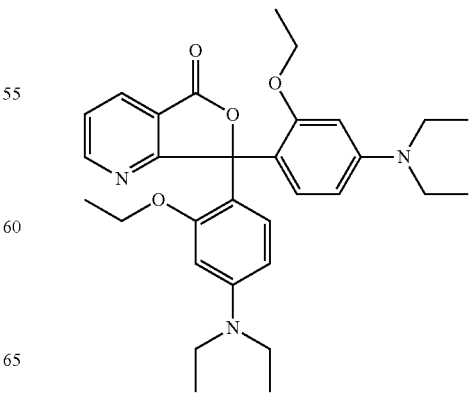

-continued

CCFC3

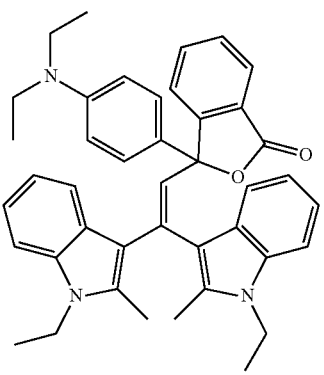

In a preferred embodiment of a laser markable layer for producing a magenta colour, the magenta colour forming compound has a structure according to Formula MCFC2:

MCFC2

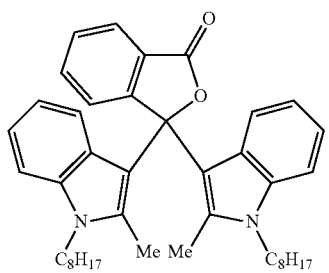

In a preferred embodiment of a laser markable layer for producing a red colour, the red colour forming compound has a structure according to Formula RCFC:

RCFC

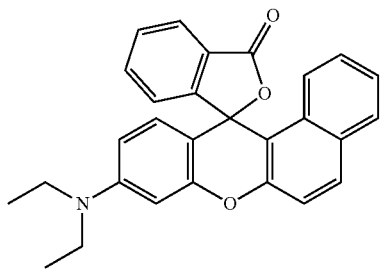

In a preferred embodiment of a laser markable layer for producing a yellow colour, the yellow colour forming compound has a structure according to Formula YCFC:

YCFC

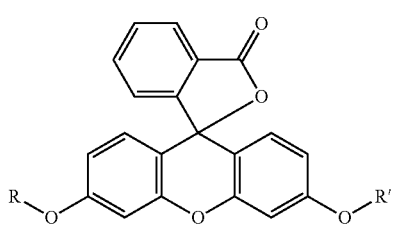

wherein R, R' are independently selected from a group consisting of a linear alkyl group, a branched alkyl group, an aryl and aralkyl group.

In one embodiment, the yellow colour forming compound has a structure according to Formula YCFC, wherein R and R' independently represent a linear alkyl group, a branched alkyl group, an aryl or an aralkyl group substituted by at least one functional group containing an oxygen atom, a sulfur atom or a nitrogen atom.

A particularly preferred yellow colour forming compound is the compound according to Formula YCFC wherein both R and R' are methyl.

In a most preferred embodiment of a laser markable layer for producing a yellow colour, the yellow colour forming compound has a structure according to Formulae YCFC1 or YCFC2.

YCFC1

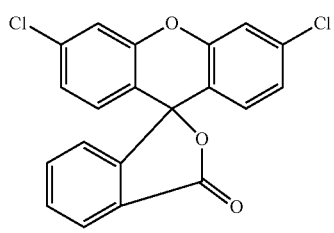

YCFC2

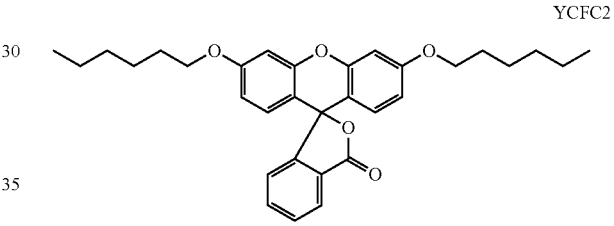

In a preferred embodiment of a laser markable layer for producing a black colour, the black colour forming compound has a structure according to Formula BCFC

BCFC

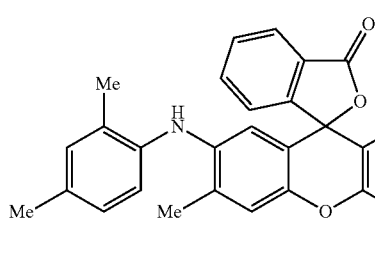

wherein Me=methyl and Et=Ethyl.
Polymeric Binder

The laser markable composition may include a polymeric binder. In principle any suitable polymeric binder that does not prevent the colour formation in a laser markable layer may be used. The polymeric binder may be a polymer, a copolymer or a combination thereof.

The laser markable layer preferably includes a water soluble or dispersible binder.

Examples of water soluble or dispersible binder are homopolymers and copolymers of vinyl alcohol, (meth)acrylamide, methylol (meth)acrylamide, (meth)acrylic acid, hydroxyethyl (meth)acrylate, maleic anhydride/vinylmethylether copolymers, copolymers of (meth)acrylic acid or vinylalcohol with styrene sulphonic acid, vinyl alcohol/vinylacetate copolymers, carboxy-modified polyvinyl alcohol, carboxymethyl cellulose, hydroxyethyl cellulose, cellulose sulfate, polyethylene oxides, gelatin, cationic starch, casein, sodium polyacrylate, styrene-maleic anhydride copolymer sodium salt, sodium polystyrene sulfonate.

Preferred vinyl alcohol-vinyl acetate copolymers are disclosed in EP-A 2103736, paragraph [79]-[82].

Other preferred water soluble or dispersible binders are the copolymers comprising alkylene and vinyl alcohol units disclosed in EP-A 2457737 paragraph [0013] to [0023] such as the Exceval™ type polymers from Kuraray.

The polymeric binder is preferably present in the colour forming layer in an amount of 1 to 30 g/m$^2$, more preferably in an amount of 2 to 20 g/m$^2$, most preferably in an amount of 3 to 10 g/m$^2$.

Acid Scavenger

The laser markable layer or another layer of the laser markable article may contain one or more acid scavengers.

Acid scavengers include organic or inorganic bases. Examples of the inorganic bases include hydroxides of alkali metals or alkaline earth metals; secondary or tertiary phosphates, borates, carbonates; quinolinates and metaborates of alkali metals or alkaline earth metals; a combination of zinc hydroxide or zinc oxide and a chelating agent (e.g., sodium picolinate); hydrotalcite such as Hycite 713 from Clariant; ammonium hydroxide; hydroxides of quaternary alkylammoniums; and hydroxides of other metals. Examples of the organic bases include aliphatic amines (e.g., trialkylamines, hydroxylamines and aliphatic polyamines); aromatic amines (e.g., N-alkyl-substituted aromatic amines, N-hydroxylalkyl-substituted aromatic amines and bis[p-(dialkylamino)phenyl]-methanes), heterocyclic amines, amidines, cyclic amidines, guanidines and cyclic guanidines.

Other preferred acid scavengers are HALS compounds. Example of suitable HALS include Tinuvin™ 292, Tinuvin™ 123, Tinuvin™ 1198, Tinuvin™ 1198 L, Tinuvin™ 144, Tinuvin™ 152, Tinuvin™ 292, Tinuvin™ 292 HP, Tinuvin™ 5100, Tinuvin™ 622 SF, Tinuvin™ 770 DF, Chimassorb™ 2020 FDL, Chimassorb™ 944 LD from BASF; Hostavin 3051, Hostavin 3050, Hostavin N 30, Hostavin N321, Hostavin N 845 PP, Hostavin PR 31 from Clariant.

Further examples of acid scavengers are salts of weak organic acids such as carboxylates (e.g. calcium stearate).

A preferred acid scavenger is an organic base, more preferably an amine.

A particular preferred acid scavenger is an organic base having a pKb of less than 7.

UV Absorbers

The laser markable article may also comprise a UV-absorber. The UV-absorber may be present in a laser markable layer or may also be present in another layer, for example an outer layer or an intermediate layer.

Examples of suitable UV-absorbers include 2-hydroxyphenyl-benzophenones (BP) such as Chimassorb™ 81 and Chimassorb™ 90 from BASF; 2-(2-hydroxyphenyl)-benzotriazoles (BTZ) such as Tinuvin™ 109, Tinuvin™ 1130, Tinuvin™ 171, Tinuvin™ 326, Tinuvin™ 328, Tinuvin™ 384-2, Tinuvin™ 99-2, Tinuvin™ 900, Tinuvin™ 928, Tinuvin™ Carboprotect™, Tinuvin™ 360, Tinuvin™ 1130, Tinuvin™ 327, Tinuvin™ 350, Tinuvin™ 234 from BASF, Mixxim™ BB/100 from FAIRMOUNT, Chiguard 5530 from Chitec; 2-hydroxy-phenyl-s-triazines (HPT) such as Tinuvin™ 460, Tinuvin™ 400, Tinuvin™ 405, Tinuvin™ 477, Tinuvin™ 479, Tinuvin™ 1577 ED, Tinuvin™ 1600 from BASF, 2-(2,4-dihydroxyphenyl)-4,6-bis-(2,4-dimethylphenyl)-s-triazine (CASRN1668-53-7) from Capot Chemical Ltd and 4-[4,6-bis(2-methyl-phenoxy)-1,3,5-triazin-2-yl]-1,3-benzenediol (CASRN13413-61-1); titanium dioxide such as Solasorb 100F from from Croda Chemicals; zink oxide such as Solasorb 200F from Croda Chemicals; benzoxazines such as Cyasorb UV-3638 F, CYASORB™ UV-1164 from CYTEC; and oxamides such as Sanduvor VSU from Clariant.

Preferred UV absorbers have in the wavelength region between 300 and 400 nm a maximum absorption above 330 nm, more preferably above 350 nm.

Particular preferred UV absorbers are hydroxyphenyl benzotriazoles and 2-hydroxyphenyl-s-triazines having a maximum absorption above 350 nm in the wavelength region 300-400 nm.

Laser Markable Article

The laser markable article according to the present invention is prepared by applying the colour laser markable composition according to the present invention on a support thereby forming a laser markable layer onto the support.

The laser markable composition may be provided onto a support by co-extrusion or any conventional coating technique, such as dip coating, knife coating, extrusion coating, spin coating, spray coating, slide hopper coating and curtain coating. Preferably the laser markable layer is coated with a slide hopper coater or a curtain coater.

The laser markable composition may also be provided onto a support by inkjet printing. Using inkjet printing is preferred when only a part or several parts of a support has to be provided with a laser markable layer.

Applying the laser markable composition according to the present invention on a support results in a colour laser markable article comprising a laser markable layer comprising polymer particles, a colour developing agent or colour developing agent precursor and an optothermal converting agent, wherein a leuco dye is covalently bound to the polymer particles.

The dry thickness of the laser markable layer is preferably between 1 and 50 g/m$^2$, more preferably between 2 and 25 g/m$^2$, and most preferably between 3 and 15 g/m$^2$.

A laser markable layer according to the present invention may be combined with other laser markable layers.

Such other laser markable layers may be another laser markable layer according to the present invention, with for example a different infrared absorbing dye and a different leuco dye, and may be used to produce multiple colours by multiple laser exposures, as disclosed in for example EP-A 2719540 and EP-A 2719541.

Such other laser markable layers may also be any known laser markable layer and may be used to produce another colour in addition to the colour formed in the laser markable layer according to the present invention.

Such other laser markable layer may also be a layer which may undergo carbonization upon exposure to infrared radiation and is therefore capable of forming a black colour. Such laser markable layers are well known in the art and are for example disclosed in EP-A 2567825 paragraph [0111] to [0123].

EP-A 2567825 also discloses a laser markable polymeric support (paragraphs [0109]-[0110]), which may also be used in combination with the laser markable composition according to the present invention.

When multiple laser markable layers are present, it may be advantageous to provide an intermediate layer between the laser markable layers to prevent colour contamination.

To further improve the daylight and/or weather resistance of the laser markable article, it may be advantageous to provide a top coat on the laser markable layer wherein the top coat may contain one or more UV absorbing compounds or one or more light stabilizing compounds, such as for example HALS compounds. It may also be advantageous to incorporate water barrier properties into the laser markable article to improve the stability of the laser marked image in high humid conditions.

Support

The laser markable composition is applied on a support to prepare a laser markable article. The composition may be applied on any surface, for example a metallic support, a glass support, a paper support.

For security documents, a preferred support is a polymeric support, more preferably a transparent polymeric support, most preferably a transparent axially stretched polyester support.

Suitable transparent polymeric supports include cellulose acetate propionate or cellulose acetate butyrate, polyesters such as polyethylene terephthalate and polyethylene naphthalate, polyamides, polycarbonates, polyimides, polyolefins, polyvinylchlorides, polyvinylacetals, polyethers and polysulfonamides.

In the most preferred embodiment, the transparent polymeric support is a biaxially stretched polyethylene terephthalate foil (PET-C foil) to be very durable and resistant to scratches and chemical substances.

The support preferably is a single component extrudate, but may also be a co-extrudate. Examples of suitable co-extrudates are PET/PETG and PET/PC.

Polyester supports and especially polyethylene terephthalate supports are preferred because of their excellent properties of dimensional stability. When polyester is used as the support material, a subbing layer is preferably employed to improve the bonding of layers, foils and/or laminates to the support.

The manufacturing of PET-C foils and supports is well-known in the art of preparing suitable supports for silver halide photographic films. For example, GB 811066 (ICI) teaches a process to produce biaxially oriented polyethylene terephthalate foils and supports.

The polyethylene terephthalate is preferably biaxially stretched with a stretching factor of at least 2.0, more preferably at least 3.0 and most preferably a stretching factor of about 3.5. The temperature used during stretching is preferably about 160° C.

Methods to obtain opaque polyethylene terephthalate and biaxially oriented films thereof have been disclosed in, e.g. US2008/238086.

Subbing Layers

The polymeric support may be provided with one or more subbing layers to improve the adhesion between the laser markable layer and the support.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the transparent oriented polyester support is provided with a subbing layer including a binder based on a polyester-urethane copolymer.

In a more preferred embodiment, the polyester-urethane copolymer is an ionomer type polyester urethane, preferably using polyester segments based on terephthalic acid and ethylene glycol and hexamethylene diisocyanate.

A suitable polyester-urethane copolymer is Hydran™ APX101 H from DIC Europe GmbH.

The application of subbing layers is well-known in the art of manufacturing polyester supports for silver halide photographic films. For example, the preparation of such subbing layers is disclosed in U.S. Pat. No. 3,649,336 (AGFA) and GB 1441591 (AG FA);

In a preferred embodiment, the subbing layer has a dry thickness of no more than 0.2 μm or preferably no more than 200 mg/m$^2$.

Additional Layers

The laser markable article may in addition to the laser markable layer according to the present invention contain additional layers, such as for example other laser markable layers, subbing layers, an outer layer that is suitable as a receiver layer for dyes applied by thermal dye sublimation or even inkjet printing, or intermediate layers between laser markable layers. An outer layer as used herein means an outermost layer, or foil.

The laser markable material preferably comprises an intermediate layer between the laser markable layers to prevent colour contamination. Such an intermediate layer may be a polymeric film such as disclosed in EP-A 2719541 but is preferably a coated layer, preferably a layer coated from an aqueous coating solution.

These intermediate layers preferably contain an acid scavenger as disclosed above to prevent diffusion of an acid from one laser markable layer to another.

Intermediate layers, or more preferably an outer layer, may contain a UV absorber as disclosed above to improve the daylight stability of the laser markable materials.

To further improve the daylight and/or weather resistance of the laser markable article, it may be advantageous to provide a top coat on the laser markable layer wherein the top coat may contain one or more UV absorbing compounds or one or more light stabilizing compounds, such as for example HALS compounds.

It may also be advantageous to incorporate water barrier properties into the laser markable article to improve the stability of the laser marked image in high humid conditions, for example by incorporating one or more intermediate and/or top layers having such water barrier properties.

Core Supports

A colour laser markable document precursor or document may be prepared by applying, preferably laminating, a colour laser markable article on a core support. The core support may be transparent or opaque. The core support is preferably an opaque white core support. The advantage of an opaque white core support is that any information present on the document is more easily readable and that a colour image is more appealing by having a white background.

Preferred opaque white core supports include resin coated paper supports, such as polyethylene coated paper and polypropylene coated paper, and synthetic paper supports such as Synaps™ synthetic paper of Agfa-Gevaert NV.

Other examples of useful high-quality polymeric supports for the present invention include opaque white polyesters and extrusion blends of polyethylene terephthalate and polypropylene. Also Teslin™ may be used as support.

Instead of a white support, a white opacifying layer can be coated onto a transparent polymeric support, such as those disclosed above. The opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In the present invention the rutile type is preferred because it has a very high refractive index, exhibiting a high covering power.

In a particular preferred colour laser markable document precursor or document, the laser markable article is applied on both sides of a core support.

Laser Marking Methods

A method of preparing a colour laser marked article according to the present invention comprises the steps of:
  providing a colour laser markable composition as described above on a support; and
  colour laser marking the article using an infrared laser.

The infrared laser may be a continuous wave or a pulsed laser.

A preferred continuous wave laser is a semiconductor laser because the device is compact and inexpensive. Most semiconductor lasers are laser diodes, which are pumped with an electrical current in a region where n-doped and p-doped semiconductor material meet. However, there are also optically pumped semiconductor lasers, where carriers are generated by absorbed pump light. Optically pumped semiconductor lasers have the advantage of unique wavelength flexibility, different from any other solid-state based laser. The fundamental near-IR output wavelength is determined by the structure of the gain chip (e.g. the semiconductor InGaAs), and can be set anywhere between about 920 nm and about 1150 nm. This allows a perfect match between the laser emission wavelength and the infrared dye absorption maximum.

A preferred pulsed laser is a solid state Q-switched laser. Q-switching is a technique by which a laser can be made to produce a pulsed output beam. The technique allows the production of light pulses with extremely high peak power, much higher than would be produced by the same laser if it were operating in a continuous wave (constant output) mode, Q-switching leads to much lower pulse repetition rates, much higher pulse energies, and much longer pulse durations.

Other Security Features

The laser markable article is preferably combined with one or more other security features to increase the difficulty for falsifying the document.

To prevent forgeries of identification documents, different means of securing are used. One solution consists in superimposing lines or guilloches on an identification picture such as a photograph. In that way, if any material is printed subsequently, the guilloches appear in white on added black background. Other solutions consist in adding security elements such as information printed with ink that reacts to ultraviolet radiation, micro-letters concealed in an image or text etc.

Suitable other security features such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, Kinegrams™, overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads.

EXAMPLES

Materials

All materials used in the following examples were readily available from standard sources such as ALDRICH CHEMICAL Co. (Belgium) and ACROS (Belgium) unless otherwise specified. The water used was deionized water.

SDS Ultra Pure is Sodium dodecyl sulfate commercially available from AppliChem GmbH Buffer (pH 9) is a phosphate buffer (0.25 M NaH2PO4).

Daran™ 8100, is a vinylidene copolymer-methyl acrylate polymer dispersion in water (60 wt %), commercially available from OWENSBORO SPECIALTY POLYMERS.

CB-01, is Cab-O-Jet 300, a carbon black dispersion from CABOT CORPORATION, 300 times diluted.

DR306 is a surfactant solution according to the following table

| g of component | DR306 |
|---|---|
| Chemguard ™ S228 | 52.6 |
| Chemguard ™ S550 | 52.6 |
| Isopropanol | 473.0 |
| water | 431.0 |

Chemguard™ 5228 is a blend of fluoro/silicone surfactants from CHEMGUARD INC.

Chemguard™ 5550 is a short-chain perfluoro-based ethoxylated nonionic fluorosurfactant from CHEMGUARD INC.

LD-01 is a leuco dye having the following chemical formula

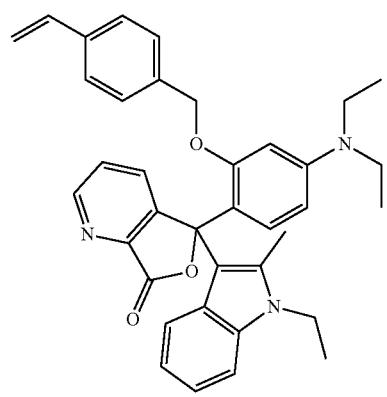 [SMILES: C=Cc1ccc(COc2cc(N(CC)CC)ccc2C2(c3c(C)n(CC)c4ccccc34)OC(=O)c3ncccc32)cc1]

LD-02 is a leuco dye having the following chemical formula
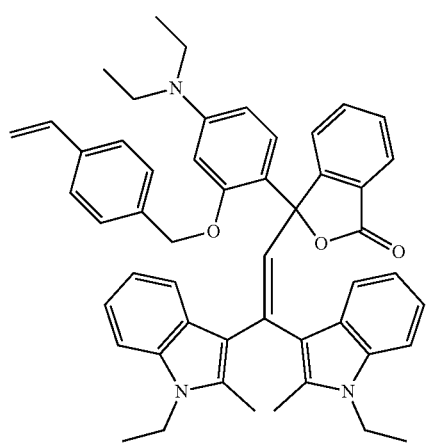 [SMILES: C=Cc1ccc(COc2cc(N(CC)CC)ccc2C2(C=C(c3c(C)n(CC)c4ccccc34)c3c(C)n(CC)c4ccccc34)OC(=O)c3ccccc32)cc1]
LD-04 is Pergascript Black 2C, a leuco dye (CASRN 89331-94-2) commercially available from BASF.
LD-07 is Wincon Red, a leucodye (CASRN 50292-95-0) commercially available from Connect Chemicals.
Example 1
Preparation of LD-01
LD-01 was prepared according to the following scheme:
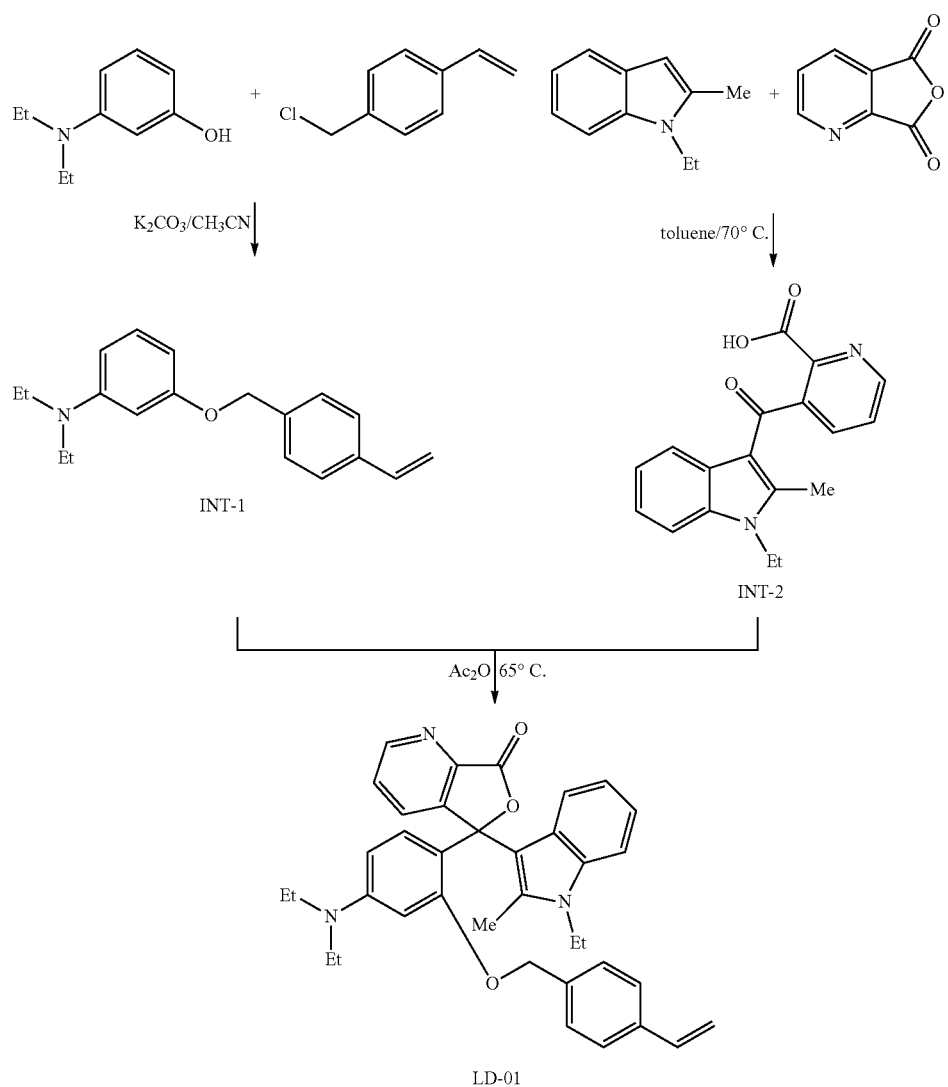

Synthesis of Diethyl-[3-(4-vinyl-benzyloxy)-phenyl]-amine (INT-1)

10 g (63 mmol) 3-diethylamino-phenol was dissolved in 100 ml acetonitrile. 29.5 g (0.189 mol) potassium carbonate was added followed by the addition of 10.6 g (63 mmol) 4-chloromethyl-styrene. The mixture was heated to reflux for 9 hours. An additional 500 μl 4-chloromethyl-styrene was added and the reaction was allowed to continue for an additional one and a half hour. The reaction mixture was allowed to cool down to room temperature and the solvent was removed under reduced pressure. The residue was recrystallazed twice from isopropanol. 7.5 g of diethyl-[3-(4-vinyl-benzyloxy)-phenyl]-amine was isolated (y: 42%)

Synthesis of 3-(1-Ethyl-2-methyl-1H-indole-3-carbonyl)-pyridine-2-carboxylic Acid (INT-2)

7.4 g (50 mmol) furo[3,4-b]pyridine-5,7-dione was added to 50 ml toluene. 8.2 g (50 mmol) 1-ethyl-2-methyl-1H-indole was added dropwise and the mixture was heated to 74° C. The reaction was allowed to continue for five hours at 70° C. The reaction mixture was allowed to cool down to room temperature and the precipitated crude 3-(1-ethyl-2-methyl-1H-indole-3-carbonyl)-pyridine-2-carboxylic acid was isolated by filtration. The crude 3-(1-ethyl-2-methyl-1H-indole-3-carbonyl)-pyridine-2-carboxylic acid was recrystallized from isopropanol. 7.5 g of 3-(1-ethyl-2-methyl-1H-indole-3-carbonyl)-pyridine-2-carboxylic acid was isolated (y: 50%).

Synthesis of LD-01

7 g (23 mmol) 3-(1-ethyl-2-methyl-1H-indole-3-carbonyl)-pyridine-2-carboxylic acid was dissolved in 100 ml acetic anhydride. 6.5 g (23 mmol) diethyl-[3-(4-vinyl-benzyloxy)-phenyl]-amine was added and the reaction was allowed to continue for 16 hours at 65° C. The reaction mixture was allowed to cool down to room temperature. Leuco dye monomer-1 was isolated by filtration washed with 100 ml water and dried. 9 g of leuco dye monomer-1 was isolated (y: 69%).

Preparation of LD-02

LD-02 was prepared according to the following scheme:

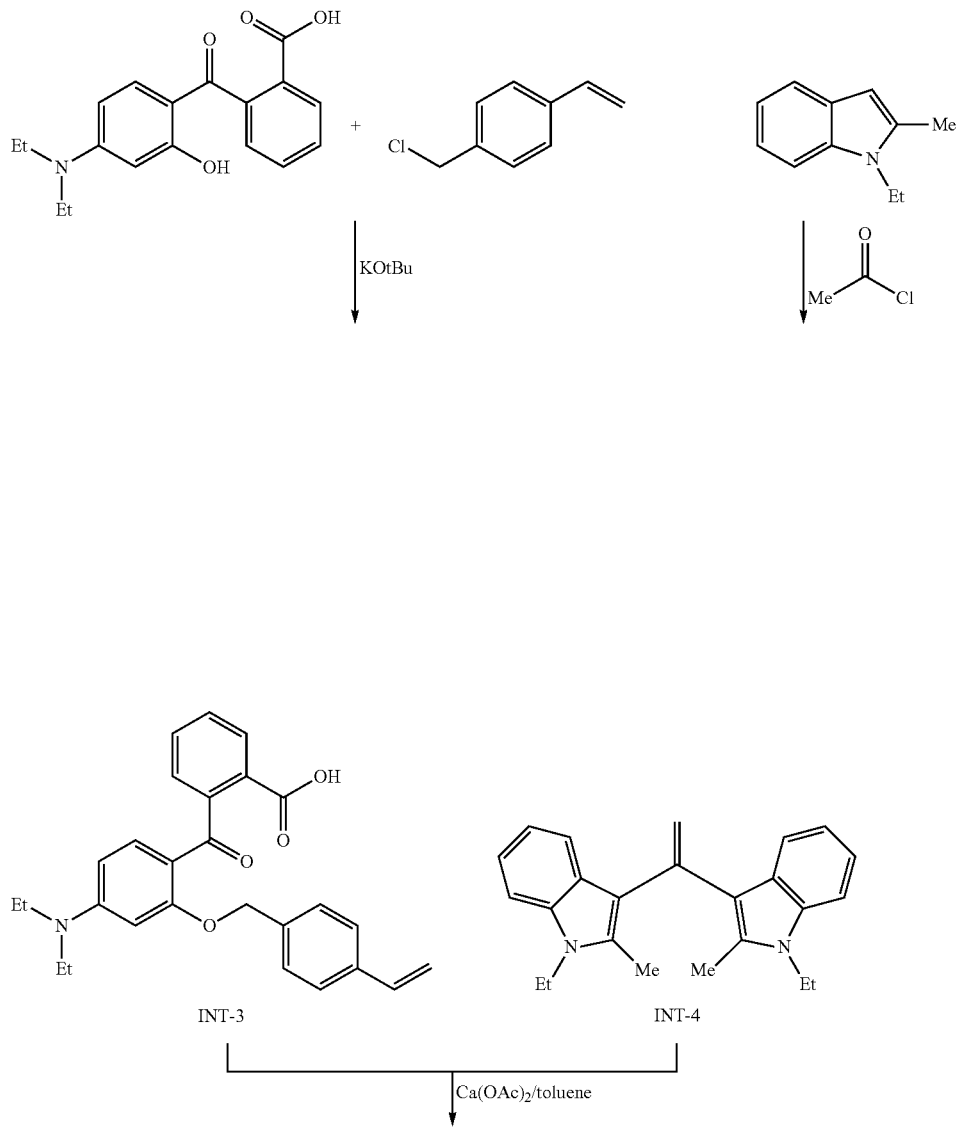

-continued

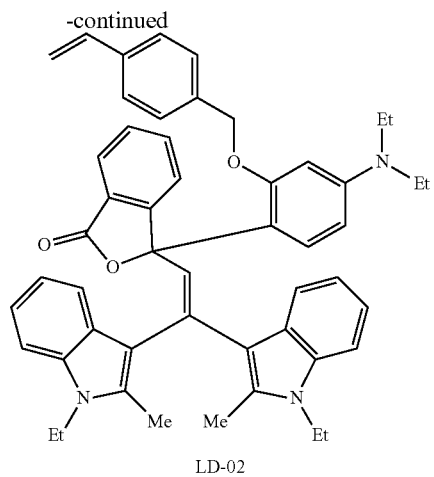

LD-02

Synthesis of 2-[4-Diethylamino-2-(4-vinyl-benzyloxy)-benzoyl]-benzoic Acid (INT-3)

31.3 g (0.1 mol) 2-(4-diethylamino-2-hydroxy-benzoyl)-benzoic acid was dissolved in 300 ml dimethylacetamide. 23.0 g (0.204 mol) potassium tert.-butanolate was added and the mixture was stirred until complete dissolution. 32 g (0.21 mol) 4-chloromethyl-styrene was added and the mixture was heated to 70° C. for two hours. The reaction mixture was allowed to cool down to 40° C. and the mixture was added to 1.5 liter water. The precipitated product was isolated and redissolved in 300 ml methanol. 25 ml of a 5N NaOH solution was added and the mixture was heated to reflux for 3 hours. 500 ml water was slowly added and the mixture was allowed to cool down to 40° C. 25 ml acetic acid was added. The crude 2-[4-diethylamino-2-(4-vinyl-benzyloxy)-benzoyl]-benzoic acid precipitated from the medium, was isolated by filtration and washed with water. The crude 2-[4-diethylamino-2-(4-vinyl-benzyloxy)-benzoyl]-benzoic acid was dissolved in 300 ml methanol and precipitated with 1.5 liter water. 2-[4-Diethylamino-2-(4-vinyl-benzyloxy)-benzoyl]-benzoic acid was isolated by filtration and dried. The dried 2-[4-diethylamino-2-(4-vinyl-benzyloxy)-benzoyl]-benzoic acid was dissolved in 200 ml ethylacetate upon reflux. 600 ml hexane was added and the mixture was allowed to cool down to room temperature. 2-[4-Diethylamino-2-(4-vinyl-benzyloxy)-benzoyl]-benzoic acid was isolated by filtration and dried. 23 g of 2-[4-diethylamino-2-(4-vinyl-benzyloxy)-benzoyl]-benzoic acid was isolated (y: 53%).

Synthesis of 1-Ethyl-2-methyl-3-[1-(1-ethyl-2-methyl-1H-indol-3-yl)-vinyl]-1H-indole (INT-4)

8.0 g (50 mmol) 1-ethyl-2-methyl-1H-indole was dissolved in 7.5 ml acetic anhydride. 1.97 g (25 mmol) acetyl chloride was added and the reaction was allowed to continue at 55° C. for four hours. The reaction mixture was directly used further without further purification.

Synthesis of Leuco Dye Monomer LD-02

To the reaction mixture of step 2, 13 ml toluene was added, followed by the addition of 4.4 g (25 mmol) calcium acetate hydrate and 10.8 g (25 mmol) 2-[4-diethylamino-2-(4-vinyl-benzyloxy)-benzoyl]-benzoic acid. The reaction was allowed to continue for two hours at 60° C. The reaction mixture as allowed to cool down to room temperature. 300 ml toluene, 200 ml water and 19 g of a 10 N NaOH solution were added. The mixture was stirred for 30 minutes at 60° C. The toluene fraction was isolated, washed with 300 ml water, dried over $MgSO_4$ and evaporated under reduced pressure. The crude leuco dye monomer-2 was isolated by preparative column chromatography on a Graceresolv RS80 column, using a gradient elution from 100% methylene chloride to methylene chloride/ethyl acetate 80/20. 8 g of leuco dye monomer-2 was isolated (y: 46%).

Preparation of the Latex LX-01

A polymer emulsion was prepared by means of a seeded emulsion polymerisation, wherein part of the monomers were brought into the reactor together with the surfactant before any initiator was added. All surfactant (3.5% relative to the total monomer amount) was added to the reactor before the reaction was started.

In a double-jacketed reactor of 700 ml, 1.12 gram SDS Ultra Pure and 206.39 gram of water was added. The reactor was put under an inert atmosphere by flushing with nitrogen. The reactor was then heated to 75° C. The monomer mixture used for preparing the seed was weighed in a dropping funnel, i.e. 1.06 gram of styrene, and 0.54 gram of acrylonitrile. When the surfactant solution reached 75° C., the seed monomer mixture was added instantaneously. The reactor was then heated for 15 minutes at 75° C. Subsequently 5.27 gram of a 2% aqueous solution of sodium persulfate was added (50% of the total initiator amount). Subsequently the reactor was heated during 30 minutes to 80° C. When the reactor reached 80° C., the monomer and initiator dosage was started. The monomer mixture of 19.92 gram of styrene and 8.83 gram of acrylonitrile and 1.6 gram of LD-01 was added during 3 hours. Simultaneously during the monomer addition, an aqueous persulfate solution was added (5.27 gram of a 2% aqueous solution of sodium persulfate). After the monomer dosing had finished, the reactor was kept at 80° C. for 1 hour. Residual monomer was removed by vacuum distillation for 1 hour at 80° C. and then the reactor was cooled to 20° C. The product was filtered using a 5 micron filter, resulting in the immobilized leuco dye dispersion LX-01 having a solid content of 12.1%, a pH of 4.6 and an average particle size of 37 nm.

LX-02 was prepared in the same manner as LX-01 except that LD-02 was used instead of LD-01. LX-02 had a solid content of 11.8%, a pH of 4.38 and an average particle size of 35 nm.

Preparation of the Latex LX-02

LX-02 was prepared as LX-01 by using LD-02 instead of LD-01. LX-02 had a solid content of 11.8%, a pH of 4.38 and a particle size of 35 nm as measured using a Brookhaven BI-90 Particle sizer.

Preparation of the Leuco Dye Dispersion LD-DISP-01

100 g LD-04, 200 g of a 5 wt % solution of Aerosol OT-100 in water and 2 g of a 5 wt % solution of 1,2-benzisothiazol-3(2H)-one, potassium salt in water were mixed into 198 g water using a DISPERLUX™ dispenser. Stirring was continued for 30 minutes. The vessel was connected to a NETZSCH MiniZeta mill filled with 900 g of 0.4 mm yttrium stabilized zirconia beads ("high wear resistant zirconia grinding media" from TOSOH Co.). The mixture was circulated over the mill for 67 minutes (residence time of 20 minutes) and a rotation speed in the mill of about 10.4 m/s. During the complete milling procedure the content in the mill was cooled to keep the temperature below 60° C. After milling, the dispersion was discharged into a vessel. The resulting concentrated dispersion exhibited an average particle size of 193 nm as measured with a Malvern™ nano-S and a viscosity of 5 mPa·s at 25° C. and at a shear rate of 10 s$^{-1}$.

Preparation of the Leuco Dye Dispersion LD-DISP-02

10 g LD-07, 20 g of a 5 wt % solution of Aerosol OT-100 in water, 0.375 g of a 8 wt % solution of sodium hydroxide in water and 0.2 g of a 5 wt % solution of 1,2-benzisothiazol-3(2H)-one, potassium salt in water were mixed into 19.425 g water and introduced into a 100 mL plastic container. The container was filed with 160 g of 3 mm yttrium stabilized zirconia beads ("high wear resistant zirconia grinding media" from TOSOH Co.). The container was sealed and placed on rotating rolls for 7 days. After roll milling, the dispersion exhibited an average particle size of 265 nm as measured with a Malvern™ nano-S.

Preparation of the PET Support PET-C

A coating composition SUB-1 was prepared by mixing the components according to the following Table 03.

TABLE 03

| wt % of components | SUB-1 |
| --- | --- |
| deionized water | 69.44 |
| CCE | 15.40 |
| Resorcinol | 12.55 |
| PAR-sol | 0.57 |
| PEA-sol | 0.68 |
| DOW-sol | 0.68 |
| Surfynsol | 0.68 |

A 1100 µm thick polyethylene terephthalate sheet was first longitudinally stretched and then coated on both sides with the coating composition SUB-1 at a wet coating thickness of 10 µm. After drying, the longitudinally stretched and coated polyethylene terephthalate sheet was transversally stretched to produce a double side subbed 63 µm thick sheet PET-C, which was transparent and glossy.

Example 2

Preparation of the Laser Markable Laminates LML-01 to LML-03

An outer layer was prepared by coating the coating solution OUT-1 shown in Table 4 on one side of the PET-C foil at a wet coating thickness of 30 µm and dried at 90° C. during 6 minutes.

The Laser Markable Laminates LML-1 to LML-3 were then obtained by coating the coating solutions shown in Table 5 on the other side of the PET-C foil at a wet coating thickness of 30 µm and dried at 90° C. during 15 minutes.

TABLE 4

| Ingredient (g) | OUT-1 |
| --- | --- |
| MEK | 87.85 |
| Sunvac HH | 10.60 |
| TOSPEARL 145 | 0.02 |
| Tinogard AS | 1.50 |

TABLE 5

| | LML-01 | LML-02 | LML-03 |
| --- | --- | --- | --- |
| DW | 9.40 | — | — |
| Buffer (pH 9) | 5.0 | — | — |
| Daran 8100 | 19.5 | 9.00 | 9.00 |
| NaOH (81 g/L) | 0.20 | 0.23 | 0.24 |
| LX-01 | — | 40.00 | — |
| LX-02 | — | — | 40.00 |
| LD-DISP-01 | 7.60 | — | — |
| LD-DISP-02 | 1.00 | — | — |
| CB-01 | 5.50 | 6.00 | 6.00 |
| DR306 | 2.00 | 0.50 | 0.50 |

Preparation of the Laser Markable Articles LMA-01 to LMA-03

The Laser Markable Laminates LML-01 to LML-03 were laminated on both sides of a 600 µm PETG CORE (from Wolfen) using an OASYS OLA 6H laminator (130° C.—220 sec).

Evaluation of the Laser Markable Articles LMA-1 to LMA3

The laser markable articles LMA-01 to LMA-03 were evaluated on a Muehlbauer CL 54 equipped with a Rofin RSM Powerline E laser (10 W) (1064 nm, 35 kHz).

The optical density of the laser marked areas were measured in reflection using a spectrodensitometer type XRITE500 using a visual filter.

To test the UV stability, the exposed laser markable articles were kept in a weathering cabinet equipped with a Xenon lamp for 72 hours after which the increase of the background density (ΔDmin) is measured.

The maximum optical densities (ODmax), the background optical densities (ODmin) and the increase of the background density upon UV exposure are shown in Table 6.

TABLE 6

| | ODmax | ODmin | ΔDmin |
| --- | --- | --- | --- |
| LMA-1 | 1.78 | 0.11 | >1.0 |
| LMA-2 | 1.23 | 0.12 | 0.1 |
| LMA-3 | 1.27 | 0.17 | 0.0 |

It is clear from the results of Table 6 that the laser markable articles wherein the leuco dyes are covalently bonded to a polymer particle have a much higher stability towards UV radiation exposure.

The invention claimed is:

1. A laser markable composition comprising:
   an aqueous medium;
   polymeric particles dispersed in the aqueous medium;
   a color developing agent or a color developing agent precursor;
   an optothermal converting agent; and
   a leuco dye covalently bonded to the polymeric particles.

2. The laser markable composition according to claim 1, wherein the polymeric particles include a copolymer of a first monomer including the leuco dye and a second monomer.

3. The laser markable composition according to claim 2, wherein an amount of the first monomer relative to a total weight of the polymer particles is between 5 wt % and 15 wt %.

4. The laser markable composition according to claim 1, wherein the polymeric particles are prepared by emulsion polymerization.

5. The laser markable composition according to claim 1, wherein the polymer particles have an average particle diameter measured by dynamic laser diffraction between 15 nm and 350 nm.

6. The laser markable composition according to claim 1, wherein the color developing agent precursor includes a polymer particle that generates an acid upon exposure to heat.

7. The laser markable composition according to claim 6, wherein the polymer particles include a vinylidene chloride copolymer.

8. The laser markable composition according to claim 1, wherein the color developing agent precursor is represented by Formula (I) or Formula (II):

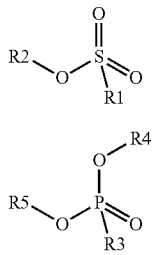

Formula I

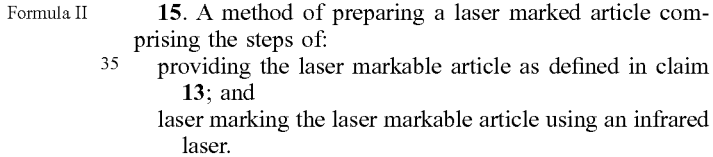

Formula II

R1 and R3 independently represent an optionally substituted alkyl group, an optionally substituted (hetero) cyclic alkyl group, an optionally substituted (hetero) aryl group, an optionally substituted aralkyl group, an optionally substituted alkoxy group, an optionally substituted (hetero)cyclic alkoxy group, or an optionally substituted (hetero)aryl group;

R2, R4, and R5 independently represent an optionally substituted alkyl group, an optionally substituted aliphatic (hetero)cyclic alkyl group, or an optionally substituted aralkyl group; and R1 and R2, R4 and R5, R3 and R4, and R3 and R5 may represent the necessary atoms to form a ring.

9. The laser markable composition according to claim 8, wherein the color developing agent precursor is represented by Formula I.

10. The laser markable composition according to claim 9, wherein R1 is a tolyl group and R2 is a $C_1$ to $C_{22}$-alkyl group or a cycloalkyl group.

11. The laser markable composition according to claim 1, wherein the optothermal converting agent includes an infrared radiation absorbing dye, an infrared radiation absorbing pigment, or a combination thereof.

12. The laser markable composition according to claim 11, wherein the infrared radiation absorbing pigment includes carbon black.

13. A laser markable article comprising:
a support; and
a laser markable composition as defined in claim 1 on the support.

14. The laser markable article according to claim 13, wherein the laser markable article is a security document precursor.

15. A method of preparing a laser marked article comprising the steps of:
providing the laser markable article as defined in claim 13; and
laser marking the laser markable article using an infrared laser.

* * * * *